United States Patent
Poulton

(10) Patent No.: US 9,383,468 B2
(45) Date of Patent: Jul. 5, 2016

(54) STREAMERS WITHOUT TAILBUOYS

(71) Applicant: PGS Geophysical AS, Lysaker (NO)

(72) Inventor: David Anthony Poulton, Gosforth (GB)

(73) Assignee: PGS Geophysical AS, Oslo (NO)

( * ) Notice: Subject to any disclaimer, the term of this patent is extended or adjusted under 35 U.S.C. 154(b) by 231 days.

(21) Appl. No.: 14/044,862

(22) Filed: Oct. 2, 2013

(65) Prior Publication Data
US 2014/0269179 A1  Sep. 18, 2014

Related U.S. Application Data

(60) Provisional application No. 61/777,723, filed on Mar. 12, 2013.

(51) Int. Cl.
*G01V 1/38* (2006.01)

(52) U.S. Cl.
CPC .................. *G01V 1/3808* (2013.01)

(58) Field of Classification Search
CPC .................................... G01V 1/3808
USPC ...................................... 367/19, 20
See application file for complete search history.

(56) References Cited

U.S. PATENT DOCUMENTS

| | | | |
|---|---|---|---|
| 3,398,715 A | | 8/1968 | Burg |
| 4,509,151 A | * | 4/1985 | Anderson ............. G01V 1/38 367/118 |
| 4,532,617 A | * | 7/1985 | Baecker et al. ............. 367/19 |
| 4,890,568 A | | 1/1990 | Dolengowski |
| 4,912,682 A | * | 3/1990 | Norton et al. ............. 367/19 |
| 5,546,882 A | | 8/1996 | Kuche |
| 7,184,366 B1 | | 2/2007 | Harrick et al. |
| 7,376,045 B2 | | 5/2008 | Falkenberg et al. |
| 7,466,627 B2 | | 12/2008 | Karlsen |
| 8,267,031 B2 | | 9/2012 | Austad et al. |

(Continued)

FOREIGN PATENT DOCUMENTS

| | | | |
|---|---|---|---|
| CA | 2730813 A1 | 8/2011 | |
| WO | 2008005707 A1 | 1/2008 | |
| WO | WO 2011014071 A2 * | 2/2011 | ............. G01V 1/38 |

OTHER PUBLICATIONS

"Seismic support vessel__Shemarah II—chase tow and offshore support," Shemarah.com, 2012, downloaded Jul. 18, 2015 from the Internet Archives as https://web.archive.org/web/20121225140749/http://www.shemarah.com/seismic-support-vessel, 2 pp.*

(Continued)

*Primary Examiner* — Daniel L Murphy
(74) *Attorney, Agent, or Firm* — Meyertons, Hood, Kivlin, Kowert & Goetzel, P.C.

(57) ABSTRACT

A streamer without a tail buoy for a marine survey is disclosed. The method and system here relate to an embodiment where at least one streamer in a marine survey is free of tail buoys. An embodiment shows that a vessel is deployed in an area where the tail end of the streamer is. In one embodiment, a vessel serves as a visual reference indicating streamer end (s). In an embodiment, a vessel is operable to control marine traffic. Because the method and system include at least one streamer without a tail buoy, entanglement of the streamer may be reduced. In some embodiments, the existing navigation equipment on a vessel may be utilized to locate a tail end of at least one streamer. The existing navigation system on the vessel may also be employed to communicate with the corresponding equipment on a survey vessel.

16 Claims, 4 Drawing Sheets

(56) References Cited

U.S. PATENT DOCUMENTS

| | | | | |
|---|---|---|---|---|
| 8,724,426 | B2* | 5/2014 | Welker | 367/19 |
| 2007/0091719 | A1* | 4/2007 | Falkenberg et al. | 367/19 |
| 2010/0302900 | A1 | 12/2010 | Tenghamn | |
| 2012/0275265 | A1 | 11/2012 | Nielsen et al. | |
| 2012/0287751 | A1 | 11/2012 | Elvestad | |
| 2013/0033960 | A1 | 2/2013 | McKey, III | |

OTHER PUBLICATIONS

Search report issued by the United Kingdom Intellectual Property Office regarding patent application No. GB1403148.6 and mailed Apr. 15, 2014, 3 pages.

COLREGS—International Regulations for Preventing Collisions at Sea, Lloyd's Register Rulefinder 2005—Version 9.4, 74 pages.

* cited by examiner

STREAMERS WITHOUT TAILBUOYS

CROSS-REFERENCE TO RELATED APPLICATION

This application claims the benefit of Provisional Patent Application No. 61/777,723 filed Mar. 12, 2013, which is hereby incorporated by reference in its entirety.

This disclosure generally relates to the field of streamers used in marine surveys, for example, marine seismic or electromagnetic survey and the like. More specifically, the present disclosure describes one or more embodiments in which one or more streamers in a streamer array are free of tail buoys during a survey operation.

BACKGROUND

Marine geophysical surveys are often used for oil and gas exploration in marine environments. Marine environments may include saltwater, freshwater, brackish water, and other similar environments. Various types of signal sources and sensors may be used in different types of geophysical surveys. For example, one type of marine geophysical survey is based on the use of pressure waves. In such a survey, a vessel may tow an acoustic source (e.g., an air gun or a marine vibrator) and a plurality of streamers along which a number of pressure sensors (e.g., hydrophones) are located. Pressure waves generated by the source may then be transmitted to the Earth's crust and then reflected back and captured at the sensors. Pressure waves received during a marine seismic survey may be analyzed to locate hydrocarbon-bearing geological structures, and thus determine where deposits of oil and natural gas may be located. As another example, marine electromagnetic (EM) surveys may be conducted using EM signals transmitted by a submerged antenna and detected by EM receivers.

In a typical marine survey, the streamers on which the sensors are located are very long, typically multiple kilometers in length. Some surveys may be conducted with a single streamer, while some surveys utilize multiple streamer systems including one or more arrays of streamers. The individual streamers in such arrays are generally affected by the same forces that affect a single streamer. Equipment used to connect streamers to the towing vessel generally maintains the depth of the forward end of the streamers and maintains the forward ends of the streamers at selected lateral distances from each other as they are towed through the water.

Each streamer of the streamer array may include a tail buoy at the distal end of the streamer. Tail buoy may typically include geodetic position receiver such as a GPS receiver that may determine the geodetic position of the tail buoy. The geodetic position receiver may be in signal communication with other relevant survey equipment.

A typical streamer can extend behind the seismic vessel for several kilometers. Because of the great length of the typical streamer, the streamer may not travel entirely in a straight line (or other planned configuration) behind the towing vessel at every point along its length due to interaction of the streamer with the water and currents in the water, among other factors. As such, the streamers in the array may have a tendency to cross and tangle, resulting in operational downtime. During deployment or retrieval of the array of streamers, entanglement may be common. Generally, streamer positioning devices may be employed to prevent the entanglement of and detangle streamers. However, when the ropes or chains connecting the tail buoys become entangled, they may require manual untangling, because they are generally not equipped with such positioning device. Manually untangling the ropes or chains and the tail buoys to which they are attached can be time consuming and costly. Unless a nearby repair vessel has the capability and availability to untangle the ropes or chains and the tail buoys, the survey operation typically must be suspended so that the array of streamers and the attached ropes or chains and tail buoys can be retrieved to be untangled by the survey vessel crew.

Another instance of entanglement may arise when the array of streamers is being towed near an offshore structure or obstacle (such as ice floes). As the wind and current may push the array of streamers and the respective tail buoys into the offshore structure or the obstacle, the streamer or the array of streamers and the respective tail buoys may hook onto or cross the structure or the obstacle resulting in entanglement, and in some cases, damage to the streamers and the sensors attached to the streamers.

In addition to being a hazard to streamers and the sensors attached thereto, tail buoy entanglement can also be hazardous to the survey crew because untangling the tail buoys often requires manual operation. Particularly in deep sea survey operations, such manual operation can be dangerous and is thus highly undesirable.

Accordingly, in marine seismic, electromagnetic, and other types of surveying, the need exists for an apparatus in place of the tail buoys but without being physically attached to the trailing end(s) of the streamer or the array of streamers. The efficiency of a survey operation is likely to increase as the above mentioned entanglement and downtime may be curtailed. The efficiency may additionally increase as the quantity of the survey equipment and the complexity of operation may be reduced. Streamers without tail buoys may also reduce towing load, resulting in further cost savings of the entire survey operation. Moreover, streamers free of tail buoys may result in reduced tug noise thereby increasing survey data accuracy. Additional advantages may include less hazardous working environment for the survey crew.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

This specification may use phrase such as "based on." As used herein, this term is used to describe one or more factors that affect a determination. This term does not foreclose additional factors that may affect a determination. That is, a determination may be solely based on those factors or based only in part on those factors. Consider the phrase "determine A based on B." This phrase connotes that B is a factor that affects the determination of A, but does not foreclose the determination of A from also being based on C. In other instances, A may be determined based solely on B.

Various devices, units, circuits, or other components may be described or claimed as "configured to", "usable to", or "operable to" perform a task or tasks. In such contexts, "configured to", "usable to" and "operable to" is each used to connote structure by indicating that the devices/units/circuits/components include structure that performs the task or tasks during an operation. As such, the device/unit/circuit/component can be said to be configured to, usable to, or usable to perform the task even when the specified device/unit/circuit/component is not currently operational (e.g., is not on or in operation). The devices/units/circuits/components used with the "configured to", "usable to", or "operable to" language include hardware—for example, circuits, memory storing program instructions executable to implement the operation, etc. Reciting that a device/unit/circuit/component is "configured to", "usable to", or "operable to" perform one or more tasks is expressly intended not to invoke 35 U.S.C. §112(f), for that device/unit/circuit/component.

While at least a portion of the explanation of the need provided herein refers to seismic surveying, it is important to recognize that the survey system here is not limited to seismic survey but rather any survey system which includes a plurality of laterally spaced-apart sensor streamers towed by a vessel. Such other types of streamers may include, without limitation, electrodes, magnetometers and temperature sensors. Accordingly, the references to seismic streamers are provided as non-limiting examples.

DETAILED DESCRIPTION

Figure 1:
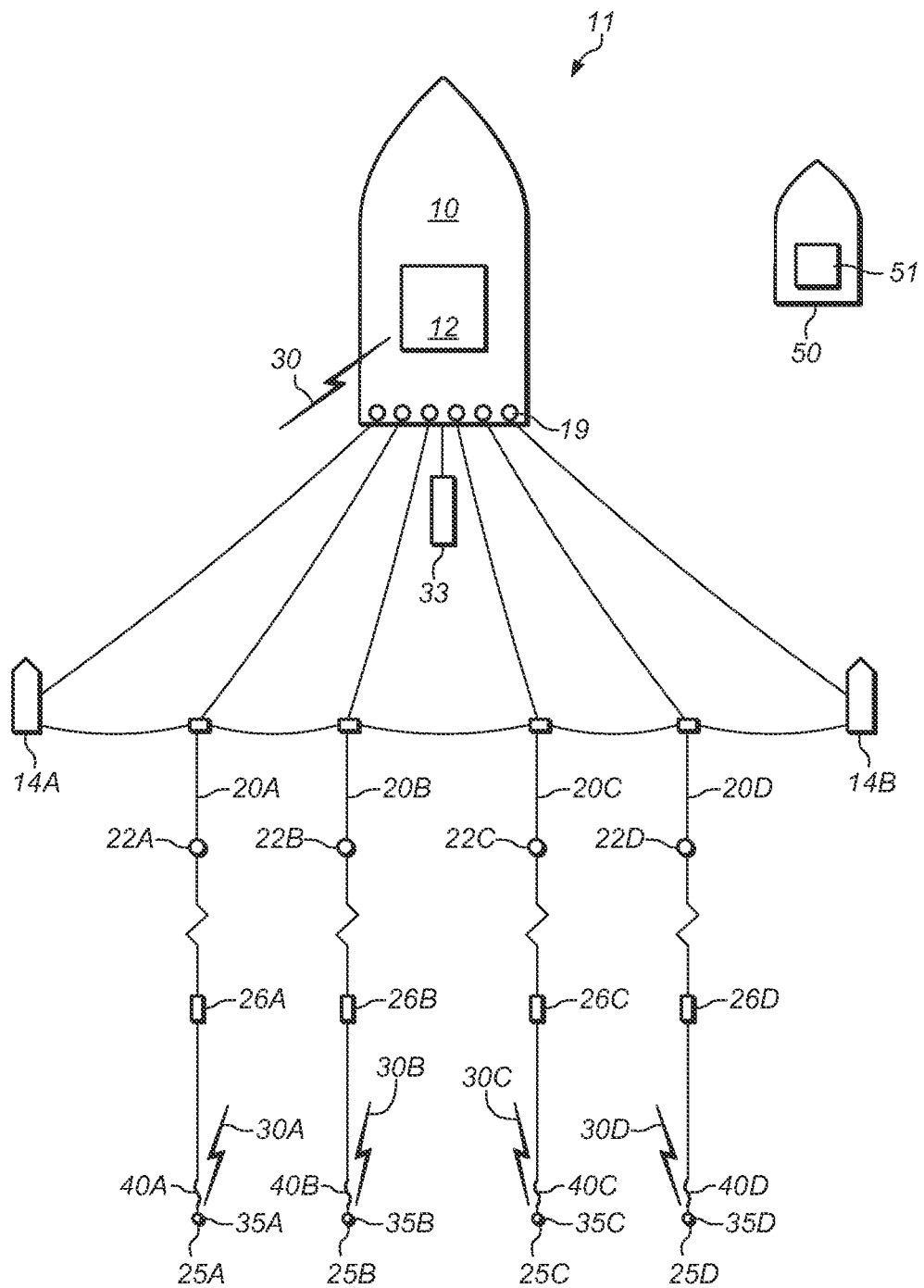
FIG. 1 depicts a vessel towing an array of streamers with each tail end attached to a tail buoy.

FIG. 1 shows an embodiment of a marine survey system that may include a plurality of streamers in a streamer array. Each of the streamers may be guided through a body of water by one or more streamer positioning devices coupled to each of the streamers. As used herein, the words "coupled", "couple", "attach," or "attached" and other derivations thereof mean a connection between components, whether direct or indirect.

Specifically, the survey system includes survey vessel 10 that moves along the surface of body of water 11 which may be saltwater, freshwater, brackish water, or other similar environments. Survey vessel 10 may include thereon equipment, shown generally at 12 and for convenience collectively referred to as "survey equipment." Survey equipment 12 may include devices such as a data recording unit (not shown separately) for making a record with respect to time of signals generated by various sensors in the acquisition system. Survey equipment 12 may also include navigation equipment (not shown separately) to determine and record, for example, the geodetic position of survey vessel 10 and other equipment.

For example, survey equipment 12 may include a geodetic position signal receiver such as a global positioning system ("GPS") receiver or other similar geodetic position determination devices known in the art including other global navigation satellite systems. Survey equipment 12 may additionally include a global control system (not shown for clarity) which is configured to send and/or receive various control information to/from survey equipment 12. The foregoing elements of survey equipment 12 are familiar to those skilled in the art, and are not shown separately in the figures herein for simplicity of the illustration.

As used herein, the term "control information" refers to information communicated in order to control or alter some operation of a survey device. Control information may include command information, request information, handshake/acknowledgement information, and/or firmware updates, for example.

In the illustrated embodiment, streamers 20A, 20B, 20C, and 20D ("20A-20D") each include multiple geophysical sensors, collectively shown as 22A, 22B, 22C, and 22D ("22A-22D") for receiving geophysical responses. As used herein, the term "streamer" includes its well-known meaning in the art refers to an apparatus that includes detectors, sensors, receivers, or other structures configured to measure signals, such as reflected or refracted signals from a formation below the bottom of the body of water 11 (e.g., by using hydrophones, geophones, electrodes, etc., that are positioned along or in proximity to the streamer). The broken lines in the streamers 20A-20D indicate that this figure is not necessarily drawn to scale, and that the array of streamers 20A-20D may in fact be considerably longer than shown.

Geophysical sensors 22A-22D may be any type of geophysical sensor known in the art. Non-limiting examples of such sensors may include particle-motion-responsive seismic sensors such as geophones and accelerometers, pressure-responsive seismic sensors, pressure-time-gradient-responsive seismic sensors, electrodes, magnetometers, temperature sensors or combinations of the foregoing. In various implementations of the disclosure, geophysical sensors 22A-22D may measure geophysical responses, for example, seismic or electromagnetic field energy primarily reflected from or refracted by various structures in the Earth's subsurface below the bottom of a body of water in response to energy imparted into the subsurface by one or more of signal sources 33.

Seismic energy, for example, may originate from signal source 33, or an array of such sources, deployed in body of water 11 and towed by survey vessel 10 (or another vessel, not shown). Electromagnetic energy may be provided by passing electric current through a wire loop or electrode pair (not shown for clarity). Signal source 33 may be any type of signal source known in the art and may be referred to collectively as signal source 33. As used herein, the term "signal source" refers to an apparatus that is configured to emit a signal (e.g., acoustic, electromagnetic, etc.) that is reflected or refracted from one or more underlying structures and then measured. Each signal source 33 may include an array of multiple signal sources. For example, signal source 33 may include a plurality of air guns or marine vibrators. Thus the term "signal source" may refer to a single signal source or a module that includes a plurality of signal sources. In various embodiments, any appropriate number of towed signal sources 33 may be included. In the illustrated embodiment, signal sources 33 are each coupled to survey vessel 10 at one end through winch 19 or a similar spooling device.

Survey equipment 12 may include control equipment for selectively operating and maneuvering signal sources 33 and/or streamers 20A-20D. In some embodiments, streamers 20A-20D and/or signal source 33 are configured to communicate with survey equipment 12 via an interface. An acoustic transducer for an acoustic interface, for example, may be coupled to vessel 10 or towed behind vessel 10 (e.g., the transducer may be included in or coupled to at least one of the streamers 20A-20D).

Other embodiments may include a second survey vessel (not shown) configured to tow signal sources and/or streamers. Survey vessel 10 may tow only signal sources 33 or only streamers 20A-20D. Although illustrated with one signal source 33 and four streamers 20A-20D, survey vessel 10 may tow any appropriate number of signal sources 33 and streamers 20A-20D.

Likewise, the number and locations of sensors 22A-22D shown in FIG. 1 is only for purposes of illustration and is not a limitation on the number or locations of sensors that may be used in any particular embodiment. Survey systems such as shown in FIG. 1 may include an array of laterally spaced-apart streamers and a plurality of sensors disposed at spaced-apart locations along each streamer.

In the survey system shown in FIG. 1, there are four streamers 20A-20D towed by survey vessel 10. The towing equipment may include paravane 14A and paravane 14B coupled to survey vessel 10. Paravane 14A and paravane 14B are the outermost components in the streamer spread and are used to provide, inter alia, streamer separation.

In FIG. 1, tail buoys 25A, 25B, 25C, and 25D ("25A-25D") are coupled to each of streamers 20A-20D. A typical tail buoy is a large raft equipped with tubular floats, lights and radar reflectors. The tail buoys are usually attached to the streamers by ropes or chains. As such, the tail buoys float on the surface of the water without necessarily raising the trailing ends of the streamers. Because the end of a fully deployed array of streamers is typically several kilometers behind the survey vessel, the tail buoys serve as visual surface markers or references so that the trailing ends of the streamers are visible to the survey crew on the survey vessel. As visual references, the tail buoys enable the crew to estimate the location of each tail end of the streamer. In some embodiments, at least some of the streamers may be at least partly underwater during part of the survey operation. In some embodiments, the tail buoys additionally serve as a reference to warn away other vessels traveling in the vicinity so that other vessels may circumvent the towed streamer array thereby preventing damage to the streamer array.

In this embodiment, tail buoys 25A-25D are attached to the respective ends of streamers 20A-20D by respective physical links 40A, 40B, 40C, and 40D ("40A-40D"). Physical links 40A-40D may be ropes, chains, or other stress-bearing instruments. As shown, tail buoys 25A-25D include, among other sensing devices and telemetry devices, geodetic position receiver 35A, 35B, 35C, and 35D ("35A-35D"). The devices may include various GPS receivers that are configured to determine the geodetic position of each tail buoy 25A-25D. The respective geodetic position receiver 35A-35D in each tail buoys 25A-25D may be in signal communication with survey equipment 12 may include control equipment for selectively operating and maneuvering signal sources 33 and/or streamers 20A-20D, via respective communication links 30A, 30B, 30C, and 30D ("30A-30D"). Links 30 and 30A-30D may be cable, wireless, optical, electrical, and/or any other suitable connection link. The quantity and locations of devices 35A-35D shown in FIG. 1 is only for purposes of illustration and is not a limitation on the number or locations of the devices that may be used in any particular embodiment.

The geodetic position devices 35A-35D in tail buoys 25A-25D, for example, may be used individually or in any combination with the various positioning components including the navigation portion of survey equipment 12. Survey equipment 12 may include a GPS receiver or any other geodetic location receiver (not separately shown). In some examples, energy source 33 may also include a geodetic position location receiver (not separately shown) such as a GPS receiver. These and other relevant components illustrated in FIG. 1 will be discussed in more detail in FIG. 2.

Vessel 50 in FIG. 1, generally known as a "chase vessel/boat", "escort vessel/boat," "guard vessel/boat," or "patrol vessel/boat" is typically engaged in marine traffic control during a survey operation to prevent collisions among vessels in the survey area. The "chase vessel" may also include "work boats", "work vessels," fast rescue raft, or other mobile platform including remotely operable vehicles (ROVs). The chase vessel may include a sail boat, fishing boat, weather boat, sampan, kayak, canoe, watercraft, raft, life boat, hovercraft, air-cushion vehicle (ACV), hydroplane, hydrofoil, semi-submersible device, submersible device, remotely operable vehicle, autonomous submersible vehicle, autonomous underwater vehicle, robotic submarine, various types of boats, vessels, ships, floating devices, submersible devices, underwater devices and other similar devices (whether commercial or not, or whether manual or not). The devices are not limited to those configured for a marine environment. Devices such as inland and coastal boats are not excluded. Such chase/guard vessels/boats are configured, as part of the survey operation, to direct traffic away from possible collision with the towing vessel, survey, vessel, other work vessels, or the streamer array.

Figure 2:
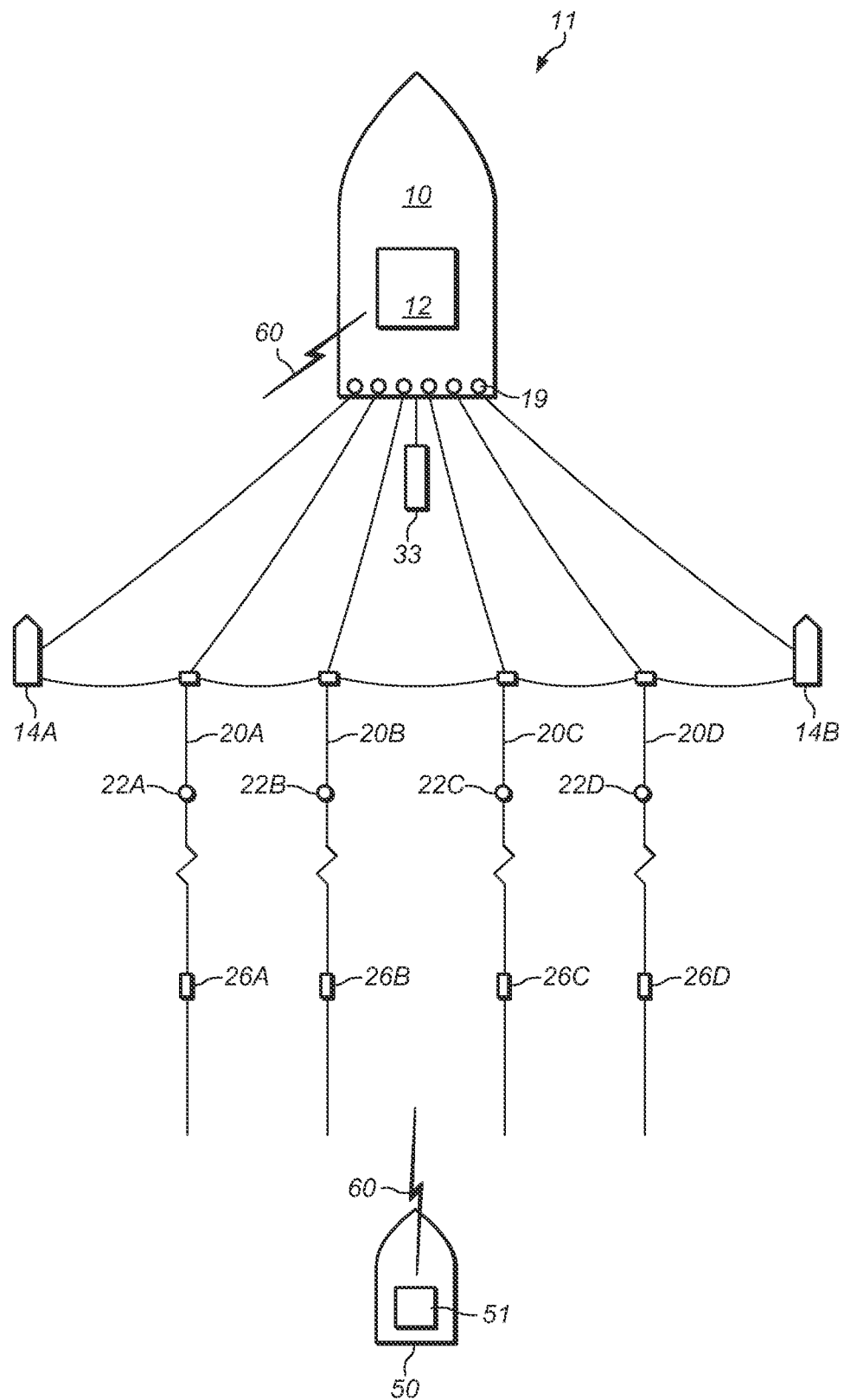
FIG. 2 depicts an embodiment showing a vessel towing an array of streamers where the streamer tail ends are free of tail buoys, having instead a vessel positioned in an area where the tail ends of the array of streamers are.

Turning now to FIG. 2, an embodiment of a method used in surveys that are at least three dimensions is depicted. Multi-dimensional surveys such as three-dimensional and four-dimensional surveys have the advantage of providing comprehensive information about the Earth's subsurface. A four-dimensional seismic survey is a three-dimensional survey over a particular area of the earth's subsurface repeated at selected times.

As shown, streamers 20A-20D do not have tail buoys attached thereto. Devices in marine environment may be deployed at the end portions of the streamer array. In the embodiment shown in FIG. 2, the device is chase vessel 50.

FIG. 2 shows, as an example, vessel 50 which is positioned in an area where the tail ends of the array of streamers 20A-20D are. Vessel 50 is typically configured to monitor and coordinate vessel traffic within the survey area. In addition to collision prevention, vessel 50 may assist in minimizing noise in survey data by directing vessel traffic away from the survey site. More than one vessel 50 (not shown) may be deployed simultaneously to prevent collisions and direct marine traffic. Vessel 50 may be equipped with equipment that is shown generally shown as 51 and for convenience and collectively referred to as "auxiliary vessel navigation equipment." Auxiliary vessel navigation equipment 51 may include equipment (not separately shown) such as acoustic positioning, GPS, and other positioning systems alike.

In some embodiments, the relevant devices/components in auxiliary vessel navigation equipment 51 may include, interface or be in signal communication with range-finding components or devices that are configured to determine relative distance between two transceivers (not separately shown) in relevant locations. In some embodiments, these components or devices may be configured to engage in one-way communication. Yet in some other embodiments, they may be configured to engage two-way communication, for example, to improve communication reliability by sending acknowledgement signals.

In this embodiment, vessel 50 is a visual reference or visual marker of the area where the ends of the array of streamers 20A-20D are. In certain embodiments, a "bullseye" (not shown) may serve as a surface reference of the area of interest. The "bullseye" may be a component on vessel 50. The "bullseye" here refers to the "bullseye" used in multi-vessel operations within the knowledge of a skilled artisan. One or more vessels 50 may be deployed in fixed or variant positions to provide such visual reference. As a result, the general location of the streamer ends is visible to the survey crew on the survey vessel. In other embodiments, vessel 50 deployed in the area where the tail ends of the streamer array are may be operable to additionally provide traffic control in the survey area. For example, vessel 50 may prevent collision by warning other vessels traveling in the vicinity to circumvent the streamer array being towed. Yet in some embodiments, vessel 50 deployed in the area where the tail ends of an array of streamers 20A-20D are may be engaged in marine traffic control of the towing and/or seismic vessel, for example, by preventing collision between the towing and/or seismic vessel with an external object such as another vessel traveling in the same vicinity.

In some embodiments, some of the streamers 20A-20D of the streamer array or parts of one of such streamers may be underwater and not clearly visible to those on the surface. In some embodiments, the survey is conducted in an area of high marine traffic including shipping and other marine operations. In yet some embodiments, while vessel 50 is deployed in the area where the tail ends of an array of streamers 20A-20D are, another vessel with similar equipment and operability may be engaged in marine traffic control (not shown). And in an alternative embodiment, vessel 50 may be deployed in the area where the tail ends of an array of streamers 20A-20D are during part of the survey operation; whereas vessel 50 is engaged in marine traffic control during other parts of the operation.

The embodiment shown in FIG. 2 also include a plurality of streamer positioning devices 26A, 26B, 26C, and 26D ("26A-26D") coupled to each streamer 20A-20D at selected positions along the streamer. The quantity and locations of streamer positioning devices 26A-26D shown in FIG. 2 is only for purposes of illustration and is not a limitation on the quantity or locations of the devices that may be used in any particular embodiment. Each streamer positioning devices 26A-26D may impart forces to the streamer in selected directions. Each streamer positioning device 26A-26D may include one or more rotatable control surfaces that when moved to a selected rotary orientation with respect to the direction of movement the water creates a hydrodynamic lift in a selected direction to urge streamers 20A-20D in a selected direction. Such selected direction may be lateral or vertical (i.e., depth) with respect to the array of streamers 20A-20D. Thus, such streamer positioning devices 26A-26D may be used to maintain streamers 20A-20D in a selected orientation. In some embodiments, it is generally desirable that the streamers 20A-20D of the array being towed assume a linear shape, so streamer positioning devices 26A-26D may be used to maintain such desired shape of the array. The particular design of streamer positioning devices 26A-26D, however, is not a limit on the scope of the present disclosure.

As used herein, the word "orientation" or "shape" includes any information regarding the geometric arrangement of a streamer. As non-limiting examples, the term "orientation" or "shape" may include the feather angle of a streamer relative to some reference axis, the position of a streamer relative to another streamer, or the position of a portion of a streamer. Collectively, the orientation of an array of streamers, such as streamers 20A-20D, may be referred to as the array "orientation." Streamer positioning devices 26A-26D may include components that are configured to communicate with survey equipment 12 and/or other survey devices using an interface including an acoustic interface.

In some embodiments, at least some streamer positioning devices 26A-26D may include a plurality of transceivers or transmitters to provide positioning indications (not separately shown for clarity). These transceivers or transmitters may be ultrasonic transceivers and/or transmitters and electronic circuitry configured to cause the transceiver to emit pulses of acoustic energy. Travel time of the acoustic energy between a transmitter and a receiver disposed at a spaced-apart position such as along the same streamer and/or on a different streamer, is related to the distance between the transmitter and a receiver, and the acoustic velocity of the water. The acoustic velocity may be assumed not to change substantially during a survey, or it may be measured by a device such as a water velocity test cell. Alternatively or additionally, these transceivers or transmitters may be disposed at selected positions along each one of the streamers not co-located with the control devices 26A-26D. Each of such devices may be in signal communication with survey equipment 12 such that at any moment in time the distance between any two such devices on any streamer 20A-20D is determinable. One or more such devices may be placed at selected positions proximate the rear end of survey vessel 10 so that relative distances between the selected positions on survey vessel 10 and any of such devices on the streamers may also be determined. The devices may be included in streamers 20A-20D (referred to as "inline" elements) or may be coupled to streamers 20A-20D.

Streamers 20A-20D may additionally or alternatively include a plurality of heading sensors (not shown for clarity) disposed at spaced-apart positions along each streamer 20A-20D. Heading sensors may be geomagnetic direction sensors such as magnetic compass devices affixed to the exterior of each of streamers 20A-20D. Such heading sensors may provide a signal indicative of the heading (direction with respect to magnetic north) of each of streamers 20A-20D at the axial position of the heading sensor along the respective streamer. Measurements of such heading at spaced-apart locations along each streamer may be used to interpolate the orientation (including the spatial distribution) of each streamer.

In the illustrated embodiment, streamer positioning devices 26A-26D are communicatively connected at least in part to the survey equipment 12. In this embodiment a global control system is included in the survey equipment 12 (not separately shown). The global control system may, for example, include a distributed processing control architecture and behavior-predictive model-based control logic to control the streamer positioning devices which in turn maintain streamer orientation and/or array shape. During operation of the embodiment shown in FIG. 2, it may be desirable to adjust portions of the streamers 20A-20B laterally or vertically in order to maintain a desired streamer orientation and position during such operation. The global control system (not separately shown) may be configured to send control signals to each of streamer positioning devices 26A-26D to move associated portions of each of streamers 20A-20D at a direction including lateral and vertical (depth) direction. When lateral direction is selected, for example, each point along each streamer is located at a predetermined relative position at any moment in time. In one embodiment, the relative positions may be referenced to the position of either survey vessel 10 or energy source 33. Various array orientation control modes, however, are not a limit on the scope of the present disclosure.

In some embodiments, the global control system (not separately shown) may include a central controller on board survey vessel 10. The central controller may be in signal communication with at least one of the streamer positioning devices 26A-26D to control the position of the streamer positioning devices. In one embodiment, the central controller may monitor the actual positions of at least one of the streamer positioning devices 26A-26D. The central controller may be programmed with desired positions or desired minimum separations of the streamers 20A-20D. The central controller may maintain a dynamic computer-based model of the streamers 20A-20D and may utilize the desired and actual positions of the streamer positioning devices 26A-26D to calculate, at various time, updated desired vertical and horizontal forces the streamer positioning devices should impart on the streamers 20A-20D to move them from their actual positions to their desired positions.

In other embodiments, the global control system may account for the behavior of the entire streamer array. The global control system may use certain position predictor software to estimate actual locations of streamer positioning devices 26A-26D. The global control system may receive various parameters from the survey equipment 12 including vessel speed and heading, current speed and heading, and others. The output of the global control system 22 may include various parameters such as towing velocity, force imparted by the streamer positioning devices 26A-26D, and others.

In some embodiments, the streamers are intended to remain straight, parallel to each other and substantially equally spaced in the lateral direction. However, after deploying the streamers, it is typically necessary for the vessel to cruise in a straight line for at least three streamer lengths before the streamer distribution approximates to this ideal arrangement and the survey can begin. This increases the time taken to carry out the survey, and therefore increases the cost of the survey. This problem may be more acute in some embodiments during the deployment and/or retrieval of the array of streamers. While, for example, streamer positioning devices 26A-26D are configured to control the streamers 20A-20D, the tail buoys which are not controlled by the streamer positioning device can be difficult to control and thus reducing the overall survey efficiency.

During deployment, the streamers are typically deployed from the aft of vessel 10. Each streamer is unwound from a reel or spool for deployment into the water. As a streamer is deployed, it is useful to determine which sections of the streamer are in body of water 11. For example, positioning devices discussed above that are either included in 26A-26D or separately located may generally provide information regarding which sections of the streamer are in body of water 11, and such information may be updated in response to the information provided by the positioning devices. The retrieval of the streamers generally follows a similar process as the deployment. In one embodiment, vessel 50 may be engaged in marine traffic control during part of the survey, but also be deployed in the area where the tail ends of the streamers are located during the deployment and retrieval of the streamers. With streamers 20A-20D now free of tail buoys 25A-25D, the potential entanglement of streamers 20A-20D, particularly during deployment or retrieval in some embodiments, may be reduced.

A survey which encounters wind, waves, currents, and other factors may result in relative movements of the streamers. As discussed in more detail in the earlier part of this section, each of streamer positioning devices 26A-26D is configured to control and maintain the orientation and position of each streamer. In one embodiment, streamers 20A-20D, including the tail ends of these streamers, are entangled as a result of external forces and/or external objects such as ice floes or off-shore structures. The streamers 20A-20D, without tail buoys 25A-25D, may be untangled by the streamer positioning devices 26A-26D imparting appropriate force at one more appropriate directions. In such instance, manually untangling tail buoys is no longer required as they are no longer attached to streamers 20A-20D.

External objects may additionally include ice platelets, frazil ice, young pancake ice, larger ice floes, and a substantially closed ice cover. Other external objects may be offshore platforms, offshore oil processing and/or producing facilities, and other man-made or natural objects. External objects may or may not be entirely visible from the surface of body of water 11. Such external objects may also be at least partly under the surface of body of water 11.

Tail buoys 25A-25D (shown in FIG. 1) that are equipped with respective geodetic position receiver 35A-35D typically communicate with the acoustic network and with the survey equipment 12 on vessel 10. However, in FIG. 2, streamers 20A-20D no longer have tail buoys attached thereto. Vessel 50 which is deployed in the area where the tail ends of the streamers are may be configured to communicate with the network and with survey equipment 12. In one example, the auxiliary vessel navigation equipment 51 on vessel 50 may be configured to generate "on the fly" or other types of acoustic networks with the transmitters and/or transceivers located (some may be included in some of streamer positioning devices 26A-26D) on and/or along the streamers 20A-20D. Such network may be in signal communication with survey equipment 12 on vessel 10 via link 60. Such "on the fly" or other types of acoustic network may therefore provide an indication of the location of at least one of the streamers 20A-20D. When the locations are determined from those transmitters and/or transceivers located at or near the end of streamers 25A-25D, the approximate locations of the tail ends of these streamers are accordingly determined. In some embodiments, multiple relevant devices, for example, acoustic transducers, may be included in survey equipment 12 and/or auxiliary vessel navigation equipment 51. Multiple transducers may be used for purposes of redundancy.

In some embodiments, the auxiliary navigation equipment 51 on vessel 50 may include one or more GPS related devices (a plurality may be used for redundancy purposes) to communicate positioning to survey equipment 12 on vessel 10. In some embodiments, the communication is similarly to that of the geodetic position receivers 35A-35D on tail buoys 25A-25D. In some embodiments, auxiliary vessel navigation equipment 51 may range to the transmitters and/or transceivers (some may be included in some of streamer positioning devices 26A-26D) on or along at least one of streamers 20A-20D thereby tying the corresponding data on vessel 50 into a network, via signal link 60, with survey equipment 12 on vessel 10. Signal link 60 may cable, wireless, optical, electrical, and/or any other suitable connection link. In some embodiments, the auxiliary navigation equipment 51 on vessel 50 may be equipped with one or more acoustic transducers which may range forward to the acoustic sensors (some may be included in some of streamer positioning devices 26A-26D) on or along least one of the streamers 20A-20D. As another example, a system or interface similar to what is currently used in the context of active doors and navigation buoys on paravanes 14A and 14B may be used between the auxiliary navigation equipment 51 on vessel 50 and the above mentioned positioning or acoustic sensors located on at least one of the streamers 20A-20D.

While signal link 60 may facilitate real-time communication among the various equipment and devices, there is no limitation for real-time communication. There is likewise no limitation on the communication method between the various relevant equipment discussed herein.

In some embodiments, it may be advantageous to have a navigation display (not shown) on vessel 50 An example of a common navigation display is part of a third party navigation system such as ION Geophysical, Corp.'s Orca system for marine geophysical surveying.

Vessel 50, an array of streamers with at least one streamer free of tail buoys, and other components and device described herein may be included in or combined with various components of a survey action. A "survey action" refers to any action performed by a survey device in the course of a marine survey. Examples of survey actions include, but are not limited to: acquiring data from a sensor, changing the angle of a deflector, entering a particular operational mode, reporting a current operational state, reporting an error, emitting a survey source signal, and updating device firmware. In some embodiments, a survey action may involve other elements, such as other vessels, streamers, platforms, buoys, moored modules, etc. In these embodiments, vessel 50, an array of streamers with at least one streamer free of tail buoys, and other components may be combined with any of various such components as part of the survey action.

Figure 3:
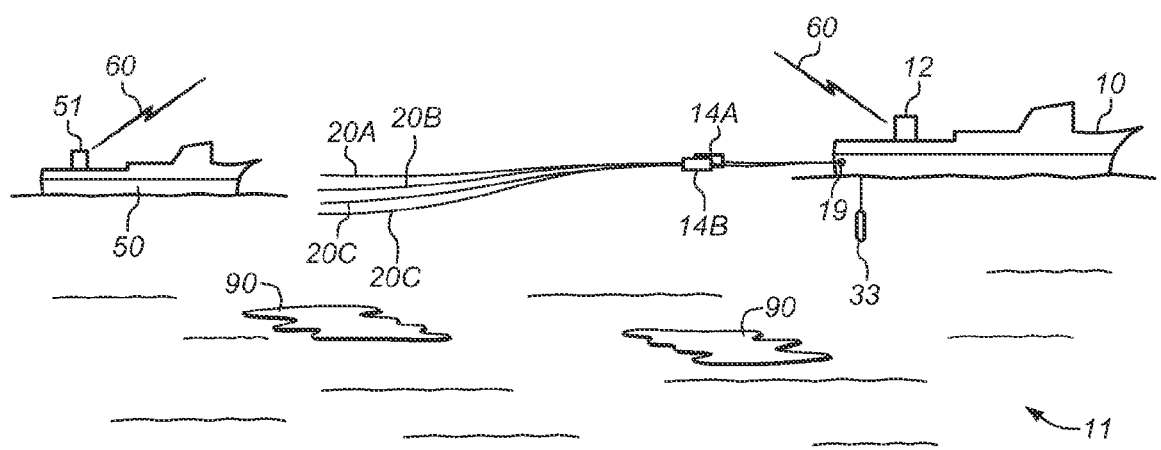
FIG. 3 depicts a side view of the embodiment of FIG. 2 in an area with ice floes.

FIG. 3 shows a side view of the embodiment in FIG. 2 where body of water 11 includes an obstacle shown as ice floes 90. Other types of obstacles may include offshore structures. In one embodiment, when streamers 20A-20D, without tail buoys 25A-25D, are entangled with each other or with the obstacle, streamer positioning devices 26A-26D may be used to untangle the streamers by imparting force at the appropriate directions. No manual untangling of tail buoys is involved in this case because the streamers 20A-20D do not have tail buoys attached thereto.

Figure 4A:
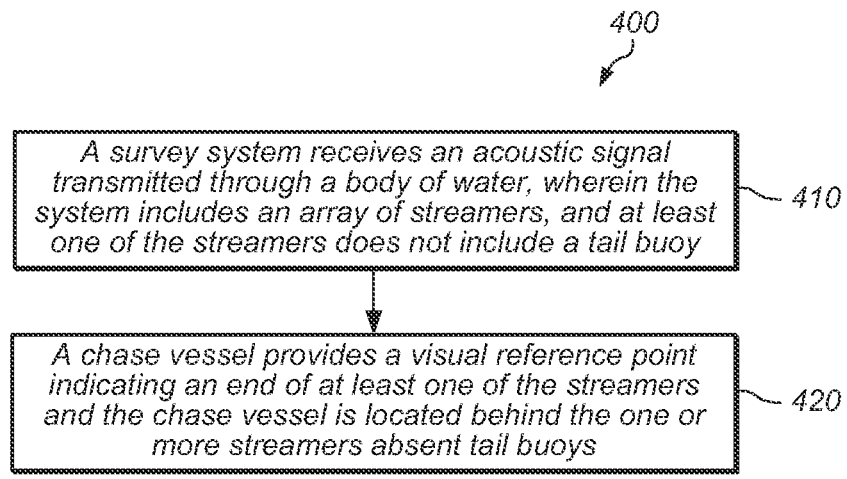
FIGS. 4A and 4B are flow diagram illustrating embodiments of methods for operating a streamer array without tail buoys.

FIG. 4A is a flow diagram illustrating one exemplary embodiment of a method 400 for operating an array of streamers without tail buoys. The method shown in FIG. 4A may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 410.

At block 410, a survey system receives an acoustic signal transmitted through a body of water. The acoustic signal includes survey information. The information may include information gathered by survey sensors, and/or status information associated various survey devices, for example. A sensor may determine the information in response to a request from survey equipment on a survey vessel, for example. The survey system includes an array of streamers, and at least one of the streamers does not include a tail buoy. Flow proceeds to block 420.

At block 420, a chase vessel provides a visual reference point indicating an end of at least one of the streamers and the chase vessel is located behind the one or more streamers absent tail buoys. Flow ends at block 420.

Figure 4B:
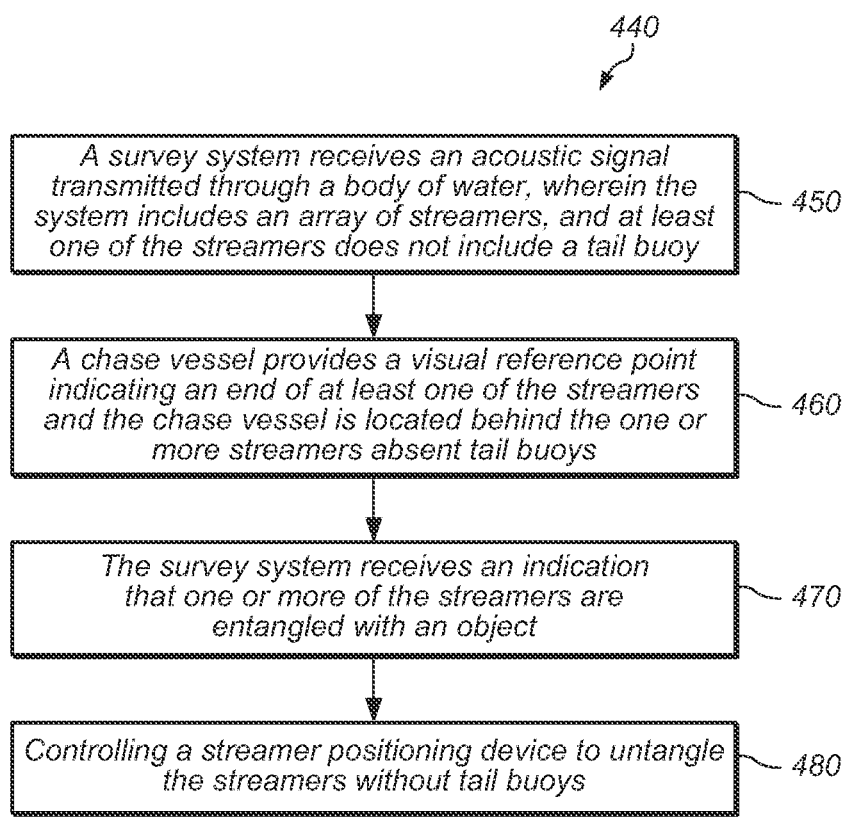

Referring now to FIG. 4B, a flow diagram illustrating one exemplary embodiment of a method 440 for operating the streamers is shown. The method shown in FIG. 4B may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 450.

At block 450, a survey system receives an acoustic signal transmitted through a body of water. The acoustic signal includes survey information. The information may include information gathered by survey sensors, and/or status information associated various survey devices, for example. The survey system includes an array of streamers, and at least one of the streamers does not include a tail buoy. Flow proceeds to block 460.

At block 460, a chase vessel provides a visual reference point indicating an end of at least one of the streamers and the chase vessel is located behind the one or more streamers absent tail buoys. Flow proceeds to block 470.

At block 470, the survey system receives an indication that one or more of the streamers are entangled with an object. Such object may be ice floes or other obstacles in the area. Flow proceeds to block 480.

At block 480, the tail ends of the streamers that are free of tail buoys are untangled at least in part by controlling a streamer positioning device. Flow ends at block 480.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A survey system, comprising:
one or more seismic sources;
a set of sensors configured to detect reflected seismic waves;
an array of two or more streamers coupled to a survey vessel, wherein ones of the set of sensors are coupled to the two or more streamers, wherein at least one of the two or more streamers in the array is not coupled to a tail buoy; and
a chase vessel in an area proximate to tail ends of streamers in the array during survey system operations, wherein the chase vessel is positioned to provide a reference point that indicates, to other vessels, locations of the tail ends of the streamers, wherein the chase vessel is not coupled to any of the one or more seismic sources or any of the set of sensors in the survey system, wherein the chase vessel is configured to establish an on-the-fly acoustic network based on one or more transmitters located proximate the tail ends of the streamers in the array, and further configured to provide positioning data based on the on-the-fly acoustic network to a global control system, wherein the provided positioning data is usable to update a model of a shape of the array.

2. The system of claim 1, wherein the array includes at least four streamers, and wherein none of the at least four streamers in the array are coupled to a tail buoy.

3. The system of claim 1, further comprising a plurality of streamer positioning devices located on at least one streamer in the array, wherein the plurality of streamer positioning devices are configured to untangle at least one streamer.

4. The system of claim 1, wherein the positioning data is based on acoustic ranging.

5. The system of claim 1, wherein the global control system is located at the survey vessel.

6. A method, comprising:
  performing a marine seismic survey using one or more seismic sources and a set of sensors configured to detect reflected seismic waves, wherein the performing includes:
    towing an array of at least two streamers behind a towing vessel, wherein ones of the set of sensors are coupled to the at least two streamers, and wherein none of the at least two streamers includes a tail buoy;
    positioning a chase vessel to provide a reference point indicating, to other vessels, locations of tail ends of streamers in the array, wherein the chase vessel is not coupled to any of the one or more seismic sources or any of the set of sensors in the marine seismic survey;
    the chase vessel establishing an on-the-fly acoustic network based on one or more transmitters located proximate the tail ends of streamers in the array; and
    the chase vessel providing positioning data based on the on-the-fly acoustic network to a global control system, wherein the provided positioning data is usable to update a model of a shape of the array.

7. The method of claim 6, wherein the global control system is located at the towing vessel.

8. The method of claim 6, wherein positioning the chase vessel causes other vessels to be directed away from an area proximate to the tail ends of the streamers in the array.

9. The method of claim 6, wherein the survey is performed in an area that includes ice floes or offshore structures.

10. The method of claim 6, wherein the positioning further comprises deploying the chase vessel from a location near the towing vessel to an area proximate to tail ends of the streamers in the array.

11. A method, comprising:
  towing an array of a plurality of streamers behind a marine vessel as part of a seismic survey that includes one or more seismic sources and a set of sensors configured to detect reflected seismic waves, wherein the array includes at least one streamer that does not include a tail buoy;
  operating, behind the at least one streamer, a chase vessel such that the chase vessel provides a reference point indicating, to at least one other vessel, an end of the at least one streamer, wherein the chase vessel is not coupled to any of the one or more seismic sources or any of the set of sensors in the seismic survey;
  the chase vessel establishing an on-the-fly acoustic network based on one or more transmitters located proximate a tail end of the at least one streamer; and
  the chase vessel providing positioning data based on the on-the-fly acoustic network to a global control system, wherein the provided positioning data is usable to update a model of a shape of the array.

12. The method of claim 11, further comprising:
  in response to a particular streamer becoming entangled with an obstacle, untangling the particular streamer by controlling a streamer positioning device coupled to the particular streamer.

13. The method of claim 12, wherein the obstacle includes an ice floe or offshore structure.

14. The method of claim 11, wherein the array further comprises a streamer positioning device that is configured to receive data from the global control system.

15. The method of claim 14, wherein the streamer positioning device is configured to provide lateral control of the at least one streamer.

16. The method of claim 11, wherein none of the plurality of streamers in the array includes a tail buoy.

* * * * *